United States Patent
Vanghi et al.

(10) Patent No.: US 6,597,923 B1
(45) Date of Patent: Jul. 22, 2003

(54) METHOD AND APPARATUS FOR TRANSMITTER POWER CONTROL

(75) Inventors: Vieri Vanghi, La Jolla, CA (US); Aleksandar Damnjanovic, San Diego, CA (US)

(73) Assignee: Telefonaktiebolaget L.M. Ericsson (publ.), Stockholm (SE)

( * ) Notice: Subject to any disclaimer, the term of this patent is extended or adjusted under 35 U.S.C. 154(b) by 397 days.

(21) Appl. No.: 09/695,394

(22) Filed: Oct. 23, 2000

(51) Int. Cl.[7] ............................................... H04Q 7/20
(52) U.S. Cl. ........................ 455/522; 455/69; 370/342
(58) Field of Search ................... 455/522, 69; 370/342, 370/311, 318; 375/358

(56) References Cited

U.S. PATENT DOCUMENTS 5,727,033 A * 3/1998 Weaver et al. ............... 375/358
6,404,826 B1 * 6/2002 Schmidl et al. ............. 370/342

FOREIGN PATENT DOCUMENTS

| EP | 0715423 A1 | 6/1996 |
| EP | 0982874 A2 | 3/2000 |
| WO | WO 00/33480 | 6/2000 |

OTHER PUBLICATIONS

Damnjanovic A D et al., "IS–2000 Enhanced Closed Loop Power Control for Turbo Coding," 2001 IEEE, pp. 2314–2318.

* cited by examiner

*Primary Examiner*—Lee Nguyen
(74) *Attorney, Agent, or Firm*—Coats & Bennett, P.L.L.C.

(57) ABSTRACT

The invention includes a device and method for improving the responsiveness of the transmitter power control function so that the transmission power is more quickly and accurately controlled over a wider range of dynamic power adjustment during transmission. The present invention is directed to a dynamic transmission power control device and methodology having improved power control loop bandwidth and low power control loop variance. The invention is particularly useful for wireless communications, and more particularly to wireless digital devices having signals with large information frame size and low target frame error rate (FER). The dynamic transmission power control methodology includes a receiver including multiple power control loops for dynamically determining the amount of adjustment to make to the incoming transmission signal to achieve a desired level of signal quality at the lowest possible transmission power. For example, two power control adjustment loops, for example an outer loop and an outer-outer loop, may be provided for determining a target signal to noise ratio (SNR). The receiver may also include an inner loop. In one preferred embodiment, the transmitter may use turbo coding decoded using an iterative decoder for forward error correction. In one variation, the turbo coding is used on the forward supplemental channel (F-SCH).

27 Claims, 4 Drawing Sheets

METHOD AND APPARATUS FOR TRANSMITTER POWER CONTROL

FIELD OF THE INVENTION

The present invention relates generally to the field of communications. More particularly, the present invention is directed to techniques for dynamically adjusting the power of a transmitter.

BACKGROUND OF THE INVENTION

Communication signals are generally sent by a transmitter across a transmission media and received by a receiver. Some transmission media result in variations in received signal quality over time. For example, in wireless communications transmission signal quality may vary due to other signal interference, physical obstructions, weather, etc. This is particularly true for mobile communications wherein at least one of the transmitter and/or received is moving during a transmission and reception sequence. As a result, various dynamic transmission power control methodologies have been included with the transmitters and/or receivers to ensure adequate transmission signal power (strength) over time so as to adjust for variations in signal quality caused by variation in the transmission media. In addition, the transmission power may be regulated so as to minimize power consumption or cross interference with other transmission signals operating in the same area and/or frequency range.

For example, transmission signal power of mobile communication system transmitters are often dynamically adjusted to achieve as low a power level as possible for a predetermined or desired signal quality and error rate of the received transmission signal. For digital signals the error rate may be referred to as the frame error rate (FER) of the transmitted signal. In essence, the lower the transmission signal power without experiencing unacceptable signal reception error, the higher the user capacity (# of users) of the wireless communication system (e.g., mobile telephone systems). This is because the lower the transmission signals power the less overlap/noise it causes on the adjacent signals in the same or close transmission band. Further, if the transmitter is in a mobile communication device which is powered by one or more batteries, operating at a lower signal power will conserve battery power. In any case, the dynamic power control may include received signal quality monitoring at the receiver, transmission to the original transmitter of a received signal quality information, and signal power adjustment by the original transmitter, which occurs in an iterative manner over transmission time.

Dynamic transmission power control methodologies are typically used for mobile communication devices such as digital mobile telephones that use, for example, code division multiple access (CDMA) signal format. CDMA communication systems typically employ power control on both a forward transmission link (e.g., base station to mobile station) and a reverse transmission link (e.g., mobile station to base station) to guarantee a desired signal quality (quality of service) and to maximize system capacity (by operating at or near a signal power level just sufficient to give a desired signal quality). Achieving such objectives requires controlling the transmitter power level to compensate for time-varying path loss and interference, so that the received power level is approximately equal to a power level corresponding to the desired FER.

Figure 1:
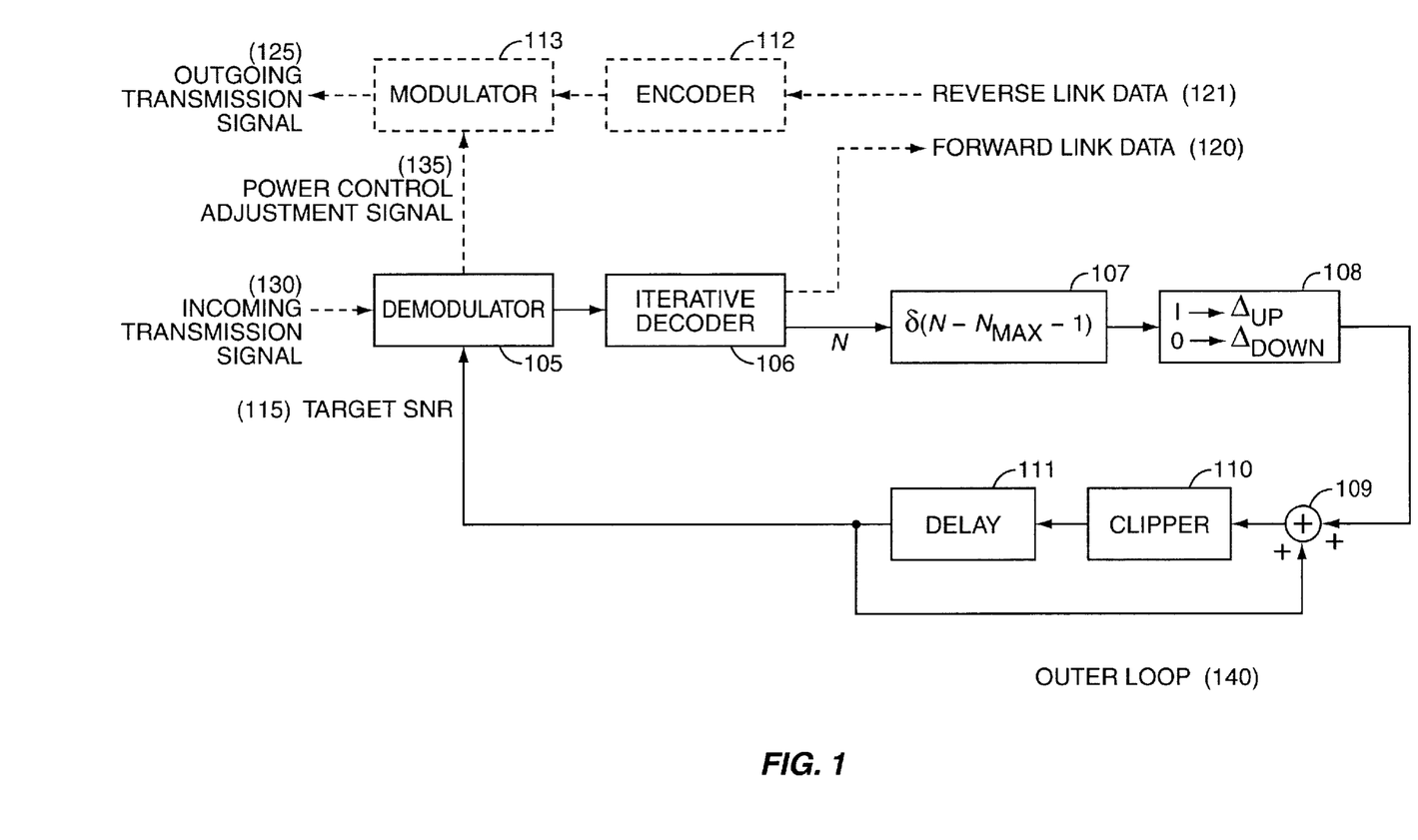
FIG. 1 is a block diagram of one conventional dynamic transmission power control device and methodology.

One conventional dynamic transmission power control methodology uses a closed loop power control implemented at the receiver for determining the quality of an incoming transmission signal and accordingly returns information on how to adjust the transmission power in an outgoing transmission signal sent to the original transmitter. One conventional closed loop power control system of this method is illustrated in FIG. 1.

The receiver demodulator unit 105 performs an inner loop power control including estimating a received signal-to-noise ratio (SNR) derived from an incoming transmission signal 130 and compares the estimated SNR with a target SNR 115 value. The target SNR is generated by an outer loop function 140 based on a comparison of an estimated FER with a target FER.

The outer loop 140 estimates the FER and compares such estimate with a target value, typically set on the basis of the required grade of service. The outer loop includes an iterative decoder 106 that decodes information contained in the incoming transmission signal 130, and has both error correction and detection capabilities. Frame error estimation uses a soft metric N provided by the iterative decoder 106, which represents the number of iterations it takes the iterative decoder 106 to generate an information frame of acceptable quality. The soft metric N is fed into an error rate threshold detector 107. Each time a frame erasure is detected, that is, the iterative decoder 106 fails to decode the frame within Nmax iterations, N is set to Nmax+1, the output of the error rate threshold detector 107 is set to 1, and the outer loop increases the target SNR value 115 by an amount $\Delta_{UP}$ which is a fixed amount of SNR. Each time a good frame is detected; that is, the iterative decoder 106 is able to decode the incoming information frame within Nmax iterations, the output of the error rate threshold detector 107 outputs a 0, and the outer loop 140 decreases the target SNR target value 115 by an amount $\Delta_{DOWN}$ which is a fixed amount of SNR. Note that typically the outer loop power control step sizes, $\Delta_{UP}$ and $\Delta_{DOWN}$, are a (fixed) function of the target FER.

The $\Delta_{UP}$ and $\Delta_{DOWN}$ values are input to a first order accumulator 109 and combined with the previous target SNR 115. Next, the new target SNR is input to a clipper 110 which is typically used to maintain the SNR target value 115 within a desired range, having a predetermined upper and lower value, within which the output target SNR is limited.

Thus, if the estimated FER exceeds the target FER, then the outer loop increases the value of the SNR target 115 provided to the demodulator and is transmitted to the inner loop power control entity (i.e., the transmitter that originally sent the decoded frame is requested to increase power). If the estimated FER is equal to our less than the target FER, the target SNR value 115 is decreased (i.e., the transmitter that originally sent the decoded frame is requested to decrease power).

A feedback channel exists between the receiver and the transmitter and is provided via the modulator 113. Based on the comparison of estimated SNR determined by the inner loop of the demodulator 105 and target SNR 115, power control information is given to the modulator 113 in the power control adjustment signal 135 indicating the magnitude of a power control signal (typically bipolar) and this information is transmitted in the outgoing transmission signal 125 on the feedback channel. If the estimated SNR received is lower than the target SNR 115, then the polarity of the power control signal transmitted on the feedback channel is set to command the original transmitter to increase its transmit power level. If the estimated SNR received is higher than the target SNR 115, the polarity of the power control signal transmitted on the feedback channel is set to command the original transmitter to decrease its transmit power level. Note that the power control adjustment signal 135 fed into the modulator is typically multiplexed with user data transmitted on the reverse link from the mobile station to the base station.

However, the conventional power control methodologies suffer from poor tracking and residual variance performance of the closed outer loop power control. The loop parameters, such as the outer loop step size $\Delta_{UP}$ and $\Delta_{DOWN}$ and the minimum and maximum target SNR of the clipper 110 are set to achieve the best trade-off between loop variance and loop equivalent bandwidth. Loop variance is a measure of the error reflecting the difference between the target SNR and required SNR that meets target FER. Loop equivalent bandwidth is a measure of how quickly the loop responds to the changes in the required SNR. Either (a) the outer loop step sizes are set to be small enough to reduce the loop variance, at the expense of reduced loop equivalent bandwidth and degraded tracking capability, or (b) are set large enough to increase the equivalent loop bandwidth, at the expense of increased loop variance and increased SNR requirement. This problem has become more acute with increased frame sizes and increases as the target FER is set to a very low value for new signaling techniques, thereby increasing the loop delay. That is, large frame size and low target FER make it more difficult to achieve an acceptable loop bandwidth/variance tradeoff. Therefore, there is a need for a new methodology that can provide better loop bandwidth and low loop variance for large information frame size and low target FER.

SUMMARY OF THE INVENTION

The invention includes a device and method for improving the responsiveness of the transmitter power control function so that the transmission power is more quickly and accurately controlled over a wider range of dynamic power adjustment during transmission. The present invention is directed to a dynamic transmission power control device and methodology having improved power control loop bandwidth and low power control loop variance. The invention is particularly useful for wireless communications, and more particularly to wireless digital devices having signals with large information frame size and low target frame error rate (FER). The dynamic transmission power control methodology includes a receiver including multiple power control loops for dynamically determining the amount of adjustment to make to the incoming transmission signal to achieve a desired level of signal quality at the lowest possible transmission power. For example, two power control adjustment loops, for example an outer loop and an outer-outer loop, may be provided for determining a target signal to noise ratio (SNR). The receiver may also include an inner loop. The outer control loop provides quick response to changes in received signal quality by making relatively large steps in the target SNR possible. The outer-outer loop helps provide the fine-tuning for outer loop steps.

In one variation, the outer loop may include an error detector and a loop filter and the outer-outer loop may include an FER estimator, an error detector, and a loop filter. In one embodiment, the outer-outer loop may have a desired or target FER dynamically input. An iterative decoder may be provided for iteratively decoding frames of digital information and tracking the number of iterations, herein referred to as N, needed before a frame is read correctly. N is input into the error detector in the first feedback loop (the outer loop) and the FER estimator of the second feedback loop (the outer-outer loop).

In another variation, the outer loop may include a discriminator or error detector having N as one input and the output of the outer-outer loop, herein referred to as N*, as another input, which operates as the outer loop target. The discriminator is followed by a multiplier that factors the output of the discriminator by a constant. Next, an accumulator receives the output of the integrator and a feedback loop. The output of the accumulator is input to a clipper that limits the output range of the target SNR. The output of the clipper is input to a delay. The result of the outer loop is a target SNR adjusted by changes in N and N*.

In a further variation, the outer-outer loop is preceded by a FER estimator. The FER estimator may include an error rate threshold detector and an increment determiner or a low pass filter. The output of the FER estimator is input to a discriminator or error detector. The output of the discriminator is input to a multiplier that factors the output of the discriminator by a constant. Next, an accumulator receives the output of the multiplier and a feedback loop. The output of the accumulator is input to a clipper that limits the output range of the target number of iterations, N*. The output of the clipper is input to a delay. The output of the outer-outer loop is a target number N* of iterations that the iterative decoder should take to determine a correct frame of digital information.

In one preferred embodiment, the transmitter may use turbo coding decoded using an iterative decoder for forward error correction. In one variation, the turbo coding is used on the forward supplemental channel (F-SCH).

In operation, the outer loop compares N with a threshold N*. If N is greater than N*, the system adjust the received SNR threshold, the target SNR, used by the inner loop power control function of the demodulator by a positive amount that depends on both N and N*. If N is smaller than or equal to N*, the system adjust the target SNR threshold used by the inner loop power control function of the demodulator by a negative amount that depends on both N and N*. The SNR adjustments are filtered by the feedback loop filter before being delivered to the inner loop power control function of the demodulator. The outer-outer loop modifies setting of the outer loop target, N*, based on the estimated FER for a frame, generated by the FER estimator. If the estimated FER exceeds the target FER, then N* is adjusted by a negative amount. If the estimated FER is below the target FER, then N* is adjusted by a positive amount. The N* adjustments are filtered by the feedback loop filter before being delivered to the outer loop power control function.

DESCRIPTION OF THE PREFERRED EMBODIMENTS

Various communication methodologies use encoding techniques at a transmitter end to encode transmitted information and a related decoding technique to decode the encoded information at the receiver end. The encoding and decoding techniques are used for various purposes, such as improving the quality of a received transmission, increased transmission speed, increased transmission capacity, securing the transmission for only the intended recipient, etc. The decoding techniques often include iterative decoding so that the received signal is iteratively decoded for a period of time to ensure the received information is free, or relatively free, from errors. Further, many communication methodologies include techniques for dynamically adjusting the transmission power of a transmitter based on feedback from the receiver regarding the quality of signal reception.

The present invention includes a device and method for improving the responsiveness of the transmitter power control function so that the transmission power is more quickly and accurately controlled over a wider range of dynamic power adjustment during transmission. The present invention is directed to a dynamic closed loop power control device and methodology having improved performance of the power control loop. . The invention is particularly useful for wireless communications including encoding and decoding, and more particularly to wireless digital devices having signals with large information frame size and low target frame error rate (FER), such as code division multiple access (CDMA) using turbo coding and protocol IS-2000-A.

Figure 2:
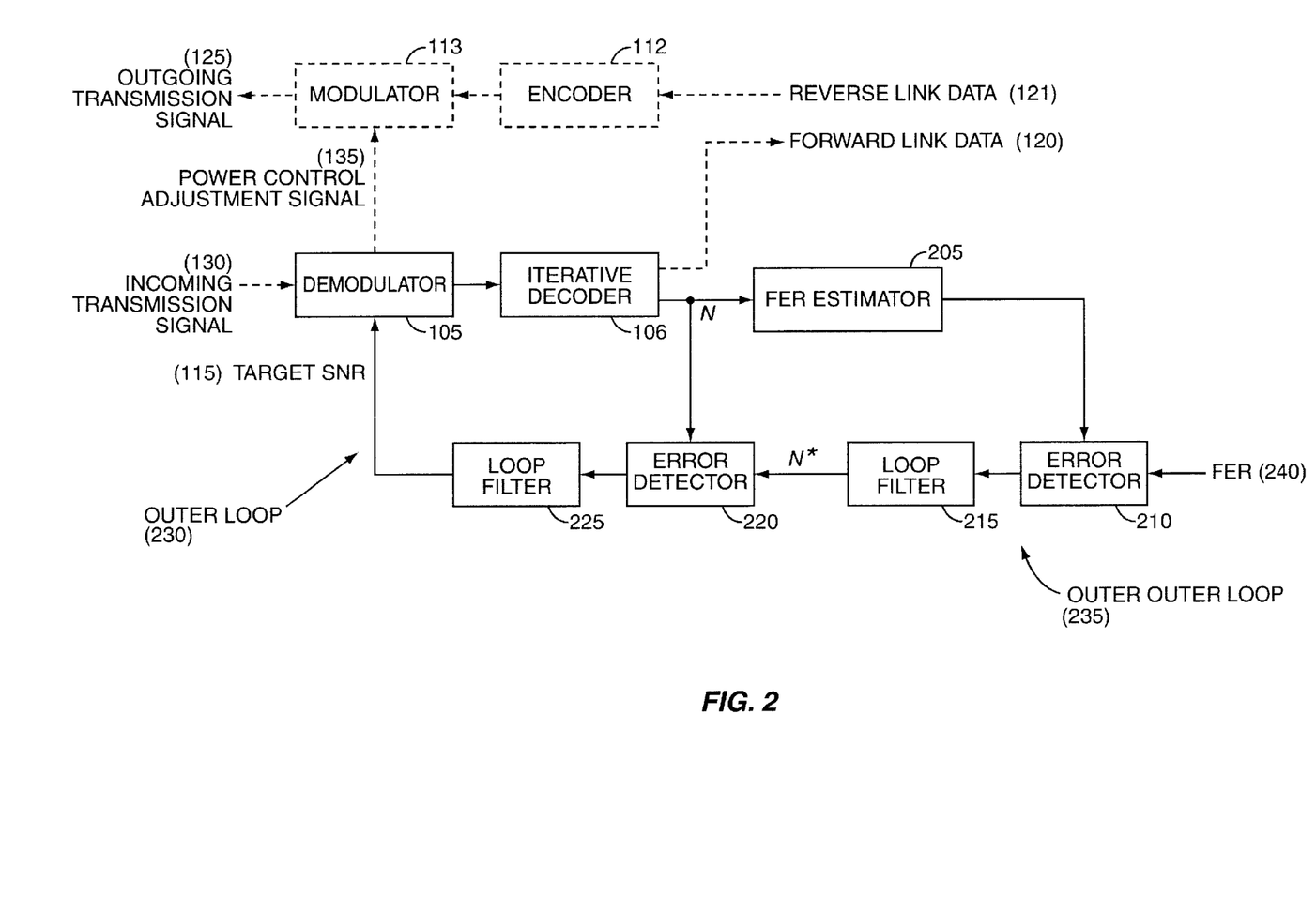
FIG. 2 a block diagram of a first embodiment for a dynamic transmission power control device and methodology, according to the present invention.

The dynamic transmission power control methodology of the present invention includes a receiver having multiple power control loops for dynamically determining the amount of adjustment to make to the incoming transmission signal so as to achieve a desired level of signal quality at the lowest possible transmission power. Referring to FIG. 2, a first exemplary embodiment illustrates the general methodology of the dynamic power control including two power control adjustment loops; an outer loop 230 and an outer-outer loop 235. The combination of the two loops is provided for determining a target signal to noise ratio (SNR) 115. The receiver includes, for example, a demodulator 105 that may include an inner loop. The inner loop insures that the SNR of the received signal meets the target SNR. The demodulator 105 is connected to an iterative decoder 106 which outputs a number N representative of the number of iterations it takes the iterative decoder 106 to decode a frame of a transmission signal at a predetermined frame quality. The outer loop 230 may include an error detector 220 and a loop filter 225. The error detector 220 may be linear or non-linear. The outer loop outputs a target SNR. The outer-outer loop 235 may be preceded by a FER estimator and include an error detector 210 and a loop filter 215. In one variation, the outer-outer loop 235 may have a desired or target FER 240 input. The FER 240 may be preprogrammed to a fixed value or vary dynamically. Dynamic change of FER is applicable for cases when the desired quality of service varies dynamically. The outer-outer loop 235 outputs an outer loop target, N*.

In operation, an incoming transmission signal 130 is received and demodulated by demodulator 105. The demodulator 105 also determines an estimate of the SNR of the incoming transmission signal to be compared against the target SNR. The demodulated incoming signal may then be input to the iterative decoder 106. The iterative decoder may then iteratively decode a frame of digital information and track the number of iterations, herein referred to as N, needed before a frame is read correctly at the predetermined quality level. The iterative decoder 106 may have a threshold number of iterations, Nmax it will complete, say Nmax= 30. In other words, the iterative decoder 106 generates soft information that includes the number of iterations, N with N<=Nmax, that took place in decoding the frame with acceptable quality. The iterative decoding process performed by the iterative decoder 106 is terminated whenever the frame quality is estimated to be good or the maximum number of iterations is reached. If, after Nmax iterations, the frame quality is not acceptable, N is set equal to Nmax+1. The iterative decoder 106 may be, for example, of a kind employed for decoding turbo code and provides the system with a soft quality information N for each decoded traffic channel frame.

The soft quality information N may then be input into the error detector 220 in the first feedback loop (the outer loop 225) and the FER estimator 205 preceding the second feedback loop (the outer-outer loop 235). The error detector 220 then compares N with a threshold or target number N* of iterations derived from the previous frames. If N is greater than N*, the error detector and the loop filter 225 adjust the target SNR 115 threshold input to the inner loop power control function of the demodulator 105 by a positive amount that depends on both N and N*. If N is smaller than or equal to N*, the error detector 220 and the loop filter 225 adjust the target SNR 115 threshold used by the inner loop power control function of the demodulator 105 by a negative amount that depends on both N and N*. The SNR adjustments are filtered by the feedback loop filter 225 before being delivered to the inner loop power control function of the demodulator 105. Thus, the demodulator 105 uses the target SNR 115 generated by the outer loop 230 and an estimated SNR derived from the incoming transmission signal, to generate an appropriate power control adjustment signal 135 that is transmitted to the original transmitter in the outgoing transmission signal 125.

The outer-outer loop 235 modifies setting of the outer loop target, N*, based on the estimated FER from the FER estimator 205. If the estimated FER exceeds the target FER 240 as determined by the error detector 210, then N* is adjusted by a negative amount. If the estimated FER is below the target FER, then N* is adjusted by a positive amount. The amount may be a predetermined amount, for example, 0.05. The N* adjustments are filtered by the feedback loop filter 215 before being delivered to the error detector 220 for outer loop power control function. Note that the inner loop within the demodulator 105, the outer loop 230, and outer-outer loop 235 may be digital and may be clocked at a predetermined rate, for example a rate equal to the inverse of the frame duration.

As configured, the closed loop transmission power control device of the present invention achieves improved performance in terms of loop bandwidth/noise tradeoff and provides better tracking and residual variance performance. The outer-outer loop 235 can be configured for a very small loop bandwidth and very small loop variance in order to reliably estimate the FER, possibly over the extended period of time that is necessary when the target FER is very low. Further, the outer loop 230 can be configured with much higher loop bandwidth without increasing significantly the loop variance because it makes use of the actual number of iterations it takes to determine a good frame, for example, the outer loop 230 uses the iterative decoder soft metric N.

Figure 3:
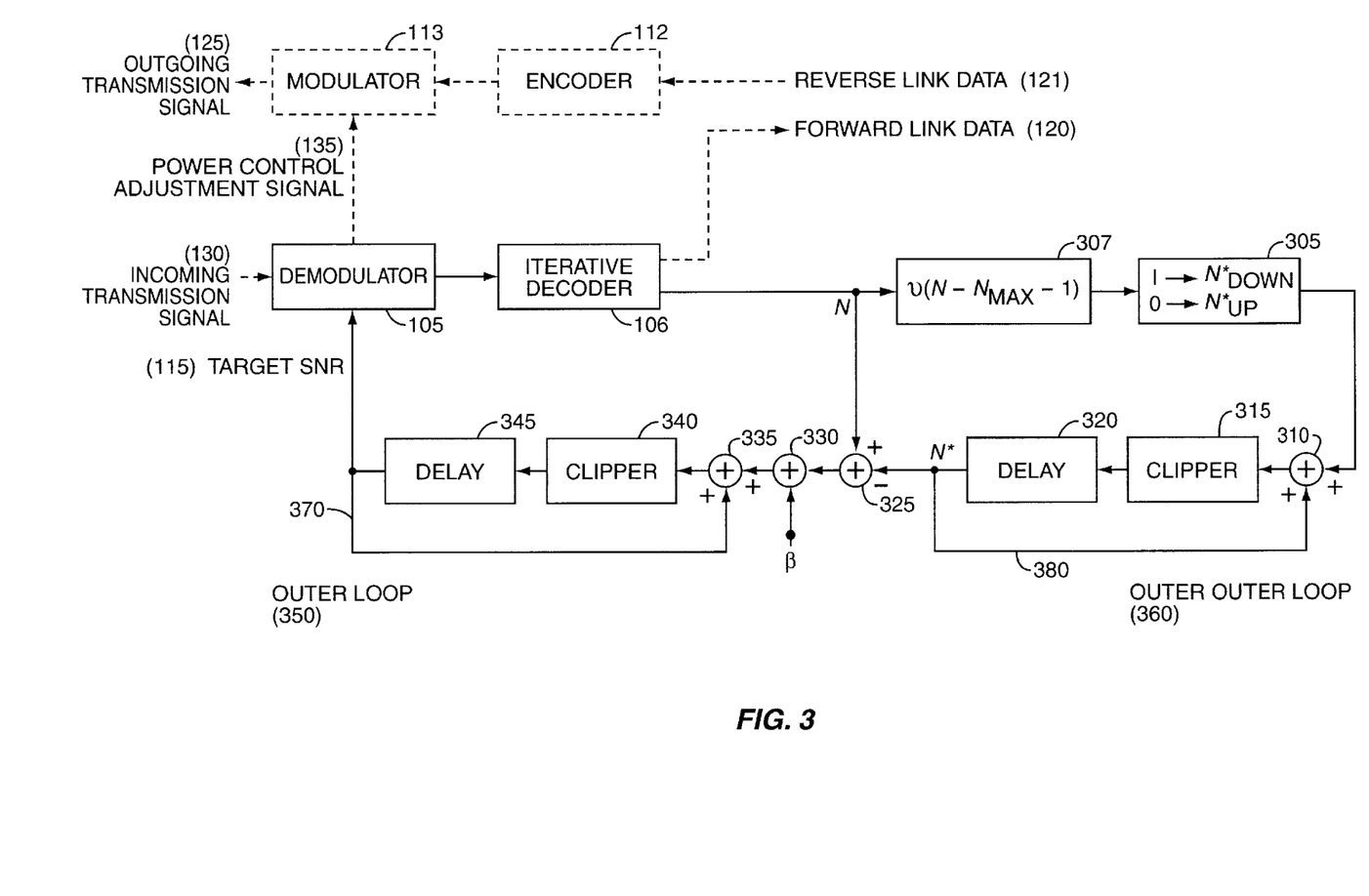
FIG. 3 is a block diagram of a second embodiment for a dynamic transmission power control device and methodology, according to the present invention.

Referring now to FIG. 3, another embodiment of the dynamic transmission power control methodology of the present invention will be described. In this embodiment, the outer loop 350 may include a discriminator 325 or error detector having N, the output of the iterative decoder 106, as one input and N*, the output of the outer-outer loop 360, as another input, where N* operates as the outer loop target.

The discriminator 325 is followed by a multiplier 330 that factors the output of the discriminator 325 by a constant β, for example, β=0.05. Next, an accumulator 335 receives the output of the multiplier 330 and a feedback loop 370. The output of the accumulator 335 is input to a clipper 340. The clipper 340 limits the output range of the target SNR 115. The output of the clipper 340 is input to a delay 345. The result of the outer loop 370 is a target SNR 115 adjusted by changes in N and N*.

The outer-outer loop 360 is preceded by a FER estimator. The FER estimator in this embodiment includes an error rate threshold detector 307 and an increment determiner 305. The output of the FER estimator is input to an accumulator 310 or error detector. The accumulator 310 receives the output of increment determiner 305 and a feedback loop 380. The output of the accumulator 310 is input to a clipper 315. The clipper 315 limits the output range of the target number of iterations, N*. The output of the clipper 315 is input to a delay 320. The output of the outer-outer loop 360 is N*, a target number of iterations which the iterative decoder should take to determine a correct frame of digital information.

In operation, an incoming transmission signal 130 is received and demodulated by demodulator 105. The demodulator 105 also determines an estimated SNR of the incoming transmission signal 130 to be compared against the target SNR 115. The demodulated incoming signal is then input to the iterative decoder 106 that iteratively decodes, for example, a frame of digital information and tracks the number of iterations N needed before the frame is read correctly at the predetermined quality level. The iterative decoder 106 may have a threshold number of iterations it will complete, for example 30, without finding a good quality frame. In other words, the iterative decoder 106 generates soft information that includes the number of iterations, N with N<=Nmax, that took place in decoding, for example, a frame of information. The iterative decoding process performed by the iterative decoder 106 is terminated whenever the signal quality (in this case frame quality) is estimated to be good. If after Nmax iterations the frame quality is not good, N is set equal to Nmax+K, where K is a predetermined number, say K=1. In an alternate embodiment, if after Nmax iterations the frame quality is not good, N is set to a value Nmax+K that is a function of the measured cross entropy at the Nmax'th iteration, or equivalent metric. K may be an integer greater than 0 and smaller than, or equal to, the predetermined number Kmax. The iterative decoder 106 may be, for example, of a kind employed for decoding turbo code and provides the system with a soft quality information N for each decoded traffic channel frame.

The soft quality information N may then be input into the discriminator 325 or error detector in the first feedback loop, outer loop 350, and the error rate threshold detector 307 and an increment determiner 305, preceding the second feedback loop, the outer-outer loop 360. The discriminator 325 then compares N with a threshold or target number N* of iterations derived from the previous frames. If N is greater than N*, the system including the error discriminator 325, the multiplier 330, the accumulator 335, the clipper.340, and the delay 345, adjust the target SNR 115 threshold input to the inner loop power control function of the demodulator 105 by a positive amount that depends on both N and N*. For example, the error discriminator 325 inputs the difference between N and N* to the multiplier. 330 that factors the output of the discriminator 325 by a constant β, for example, β=0.05. Then, an accumulator 335 receives the output of the multiplier 330 and a feedback loop 370. The output of the accumulator 335 is input to the clipper 340 which allows the revised SNR value to proceed to the delay 345 and subsequently to the demodulator 105, unless the revised SNR value is outside a predetermined range for the target SNR. For example, the clipper 340 may limit the target SNR to a range of 1 dB<SNR<3 dB. On the other hand, if N is smaller than or equal to N*, the system adjust the target SNR 115 threshold used by the inner loop power control function of the demodulator 105 by a negative amount that depends on both N and N*, unless the revised SNR value is outside a predetermined range for the target SNR. In essence, the clipper 340 operates to insure that the outer loop 350 operates within an operating range between $SNR_{Min}$ and $SNR_{MAX}$. That is, the clipper 340 output is equal to min{max{ $SNR_{MIN}$, Xin} ; $SNR_{MAX}$}, where Xin is the digital input to the clipper 340. Thus, the SNR adjustments are filtered by the feedback loop filter, including the accumulator 335, clipper 340, delay 345 and feedback 370, before being delivered to the inner loop power control function of the demodulator 105.

The outer-outer loop 360 modifies setting of the outer loop target, N*, based on the estimated FER. In the embodiment of FIG. 3, the FER estimator may include an error rate threshold detector 307 and an increment determiner 305. The threshold detector 307 may operate using a step function, for example, υ(x)=υ(N−Nmax−1). The unit step function υ(x) operates such that υ(x) =1 for x>=0, and υ(x)=0 for x<0. The increment determiner 305 may operate such that if N is above Nmax, then N* is adjusted by a positive amount, for example 1. If N is equal or below Nmax, then N* is adjusted by a negative amount, for example −0.01. The amount of increase or decrease in N* may be any predetermined fixed amount which gives the desired step size changes in the outer loop target N*. The N* adjustments are filtered by a feedback loop filter which may include an accumulator 310, a clipper 315, a delay 320, and a feedback signal line 380, before being delivered to the error detector or error discriminator 325 for operation of the outer loop power control function. The clipper 315 operates similar to clipper 340, and in this case restricts the outer-outer loop 360 operating range between $N*_{MIN}$ and $N*_{MAX}$. That is, the clipper's 315 output is equal to min{max{$N*_{MIN}$, Xin} ; $N*_{MAX}$}, where Xin is the digital input to the clipper 315.

Figure 4:
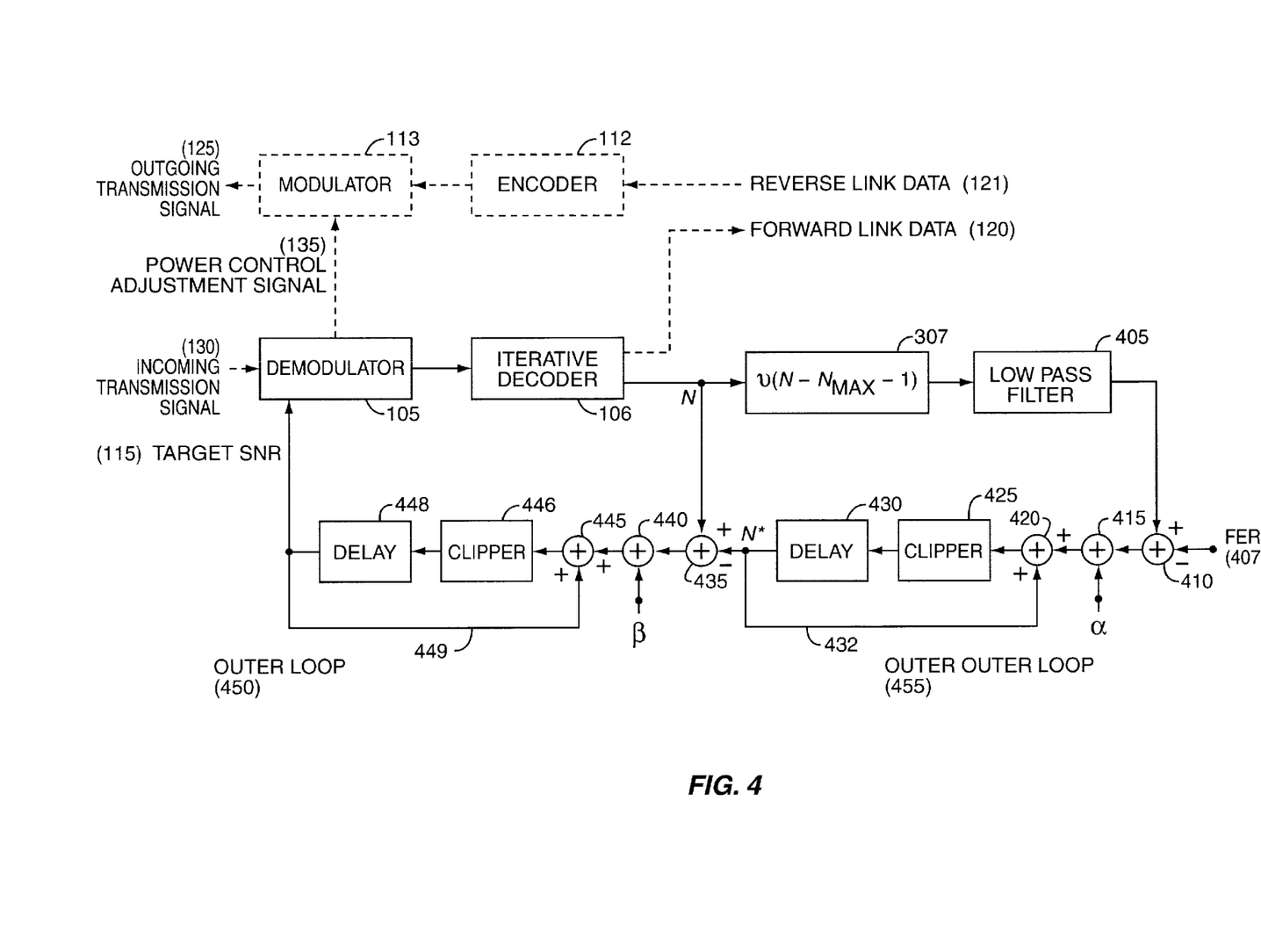
FIG. 4 is a block diagram of a third embodiment for a dynamic transmission power control device and methodology, according to the present invention.

Referring to FIG. 4, a further embodiment of the dynamic transmission power control methodology according to the present invention will be described. The outer loop 450 of this embodiment can be understood by reference to the outer loop 350 described above, and thus will not be described here in detail. However, it is noteworthy that the discriminator 435 is illustrated as linear but may be better as a non-linear discriminator because a non-linear discriminator is more flexible in adjusting the optimum loop variance/ bandwidth trade-off. In operation, the outer loop 450 compares N with a threshold N*. If N is greater than N*, the outer loop 450 adjust the received SNR threshold, the target SNR, used by the inner loop power control function of the demodulator 105 by a positive amount that depends on both N and N*. For example if N=9, N*=7 and β=0.05 SNR is incremented by β(N−N*)=0.1. If N is smaller than or equal to N*, the system adjust the received SNR threshold used by the inner loop power control function of the demodulator 105 by a negative amount that depends on both N and N*. For example, if N=5, N*=7 and β=0.05, then SNR is incremented by β(N−N*)=−0.1.

The outer-outer loop 455 is preceded by a FER estimator, which in this embodiment includes an error rate threshold detector 307 and a low pass filter 405. The low pass filter may generate an average FER based on, for example, the last 500 values of 0 (i.e., good frame found) and 1 (i.e., frame not good) including the most recent frame failure rate result, 0 or 1, output by the error rate threshold detector 307. This estimated average FER might then be compared against a target FER with the error discriminator or error detector 410. The output of the discriminator 410 is input to a multiplier 415 that factors the output of the discriminator by a constant $\alpha$, which allows the control of the outer-outer loop 455 bandwidth. The larger the value of $\alpha$ the larger the bandwidth of outer-outer loop 455. The constant $\alpha$ converts the FER differential to an increment of N*. For example, if the target FER=0.01 and estimated FER=0.02 and $\alpha$=1, N* is incremented by $\alpha$(target FER−estimated FER)=−0.01. However, if for the same target and estimated FER, $\alpha$=2, N* is incremented by −0.02. Next, an accumulator 420 receives the output of the multiplier 415 and a feedback loop 432. The output of the accumulator 420 is input to a clipper 425 that limits the output range of the target number of iterations, N*. The output of the clipper 425 is input to a delay 430. The output of the outer-outer loop 455 is a target number of iterations N* which the iterative decoder 106 should take to determine a good frame of digital information according to a predetermined quality of service level.

In operation, the outer-outer loop 455 modifies setting of the outer loop target, N*, based on the estimated FER for a frame and, for example, the average of estimated FER over the last 500 frames as generated by the error rate threshold detector 307 and low pas filter 405, generating an estimated average FER. The estimated average FER is an average of the number or frame erasures that have occurred over, for example, the past say 500 frames. This estimated average FER is then compared with a target FER 407. If the estimated average FER exceeds the target FER 407, then N* is adjusted by a negative amount. For example, if the target FER=0.0 and estimated FER=0.2 and $\alpha$=2, N* is incremented by $\alpha$(target FER−estimated FER)=−0.02. If the estimated average FER is below the target FER 407, then N* is adjusted by a positive amount. For example, if the target FER=0.01 and estimated FER=0.005 and $\alpha$=2, N* is incremented by $\alpha$(target FER−estimated FER)=0.01. The N* adjustments are filtered by the feedback loop filter which may include an accumulator 420, a clipper 425, a delay 430, and a feedback signal line 432, before being delivered to the outer loop 450 and the outer loop power control function. The outer-outer loop 455 finely tunes the increase and decrease of the target SNR 115 by incrementing the target iteration N* input to outer loop 450. For example, the increment in the target SNR may be determined by the difference in the number of iterations N and the target number of iterations N*, as $\beta(N-N^*)$. For a specific N, N* together with $\beta$, helps fine-tune the increment in the target SNR. Further, this embodiment helps reduce the swings in the transmitter power, since it reduces the loop variance.

Although the low pass filter 405 has been explained as generating an average, it could have any impulse response such as generating a weighted average, or any other function useful to compliment the outer loop 450 and provide in combination the desired loop dynamic properties. Further, although the FER estimator was shown to include a low pass filter 405, it may be any type of estimation filter and the error rate threshold detector 307 may be any type of frame erasure detector. In any case, the impulse response of the estimation filter may be designed by those skilled in the art in order to affect loop dynamic properties as desired.

As previously noted, in one variation of the invention the transmitter for digital mobile telephones may use CDMA and turbo coding for encoding the transmitted digital information sent via the incoming transmission signal 103. This signal may then be demodulated by the demodulator 105 and decoded using an iterative decoder 106. The invention is applicable to either forward error correction or reverse error correction. The invention is particularly applicable to turbo coding used on the forward supplemental channel (F-SCH).

Although particular embodiments of the present invention have been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention.

Any and all publications, patents, and patent applications cited herein are hereby incorporated by reference in their entirety for all purposes.

What is claimed is:

1. A dynamic transmission power control system, comprising:
   a decoder that generates a first value indicating a number of decoding iterations it takes to decode transmitted information of acceptable quality;
   an error rate estimator that generates an estimated error rate of failed transmission information with said first value as an input;
   a first power, control loop comparing said estimated error rate with a target error rate and generating a second value indicative of a target number of decoding iterations; and
   a second power control loop comparing said first value with said second value to generate a third value indicative of a needed change to a power level of a transmitted signal for a desired signal quality.

2. The system according to claim 1, wherein said second power control loop includes a first error detector for receiving said first value and said second value.

3. The system according to claim 2, wherein said second power control loop further includes a first loop filter coupled to said first error detector.

4. The system according to claim 3, wherein said first loop filter includes a first clipper for setting the allowable range of said third value.

5. The system according to claim 4, wherein said first error detector includes a discriminator for receiving said first value and said second value, and a multiplier coupled to said discriminator.

6. The system according to claim 5, wherein said discriminator is selected from the group consisting of linear discriminators and non-linear discriminators.

7. The system according to claim 3, wherein said first power control loop includes a second error detector for receiving said estimated error rate.

8. The system according to claim 7, wherein said first power control loop further includes a second loop filter coupled to said second error detector.

9. The system according to claim 8, wherein said second loop filter includes a second clipper for setting the allowable range of said second value.

10. The system according to claim 1, wherein said first power control loop includes an error detector for receiving said estimated error rate.

11. The system according to claim 10, wherein said first power control loop further includes a loop filter coupled to said error detector.

12. The system according to claim 11, wherein said loop filter includes a clipper for setting the allowable range of said second value.

13. The system according to claim 12, wherein said error detector includes a discriminator for receiving said estimated error rate and said target error rate, and a multiplier coupled to said discriminator.

14. The system according to claim 13, wherein said discriminator is selected from the group consisting of linear discriminators and non-linear discriminators.

15. The system according to claim 1, wherein said system is used to adjust transmission power of signals for a mobile telephone system.

16. The system according to claim 15, wherein said signals are digital code division multiple access format and encoded using turbo code.

17. The system according to claim 16, wherein said error rate estimator is a frame error estimator that determines the number of poor quality frames erased.

18. The system according to claim 17, wherein said frame error estimator includes an error rate threshold detector.

19. The system according to claim 18, wherein said frame error estimator further includes a low pass filter coupled to said error rate threshold detector.

20. The system according to claim 18, wherein said frame error estimator further includes an increment determiner coupled to said error rate threshold detector.

21. The system according to claim 1, wherein said decoder determines that a maximum number of iterations is reached and the decoded transmitted information is not of acceptable quality, said decoder generates a predetermined value greater than the maximum number of iterations.

22. The system according to claim 1, wherein if said decoder determines that a maximum number of iterations is reached and the decoded transmitted information is not of acceptable quality, said decoder generates a first value greater than the maximum number of iterations, indicating a quality of the decoded transmitted information based on the measured cross-entropy or an equivalent metric.

23. A method for dynamic adjusting transmission power, comprising the steps of:

iteratively decoding a received signal and determining a first value indicating a number of decoding iterations it took to decode transmitted information of acceptable quality from said received signal;

estimating an error rate of failed transmission information that did not have said acceptable quality with an error rate estimator using said first value as an input;

generating a second value, indicative of a target number of decoding iterations, with a first power control loop that compares said estimated error rate with a target error rate; and generating a third value, indicative of a needed change to a power level of a said received signal for a desired signal quality, with a second power control loop that compares said first value with said second value.

24. The system according to claim 23, further including the step of:

setting said first value to a predetermined number greater than the maximum number of iterations if the transmitted information is not decoded with acceptable quality after a maximum number of iteration has been reached.

25. The system according to claim 23, further including the step of:

setting said first value to a number greater than the maximum number of iterations based on a measured cross-entropy or equivalent metric, if the transmitted information is not decoded with acceptable quality after a maximum number of iteration has been reached.

26. The system according to claim 23, wherein said first power control loop includes a first error detector that receives said estimated error rate and a first loop filter coupled to said first error detector.

27. The system according to claim 26, wherein said second power control loop includes a second error detector that receives a frame error rate and a second loop filter coupled to said first error detector and said second error detector.

* * * * *